(No Model.) 3 Sheets—Sheet 1.
H. W. CAMPBELL.
SEEDER, ROLLER, AND PULVERIZER.
No. 479,242. Patented July 19, 1892.
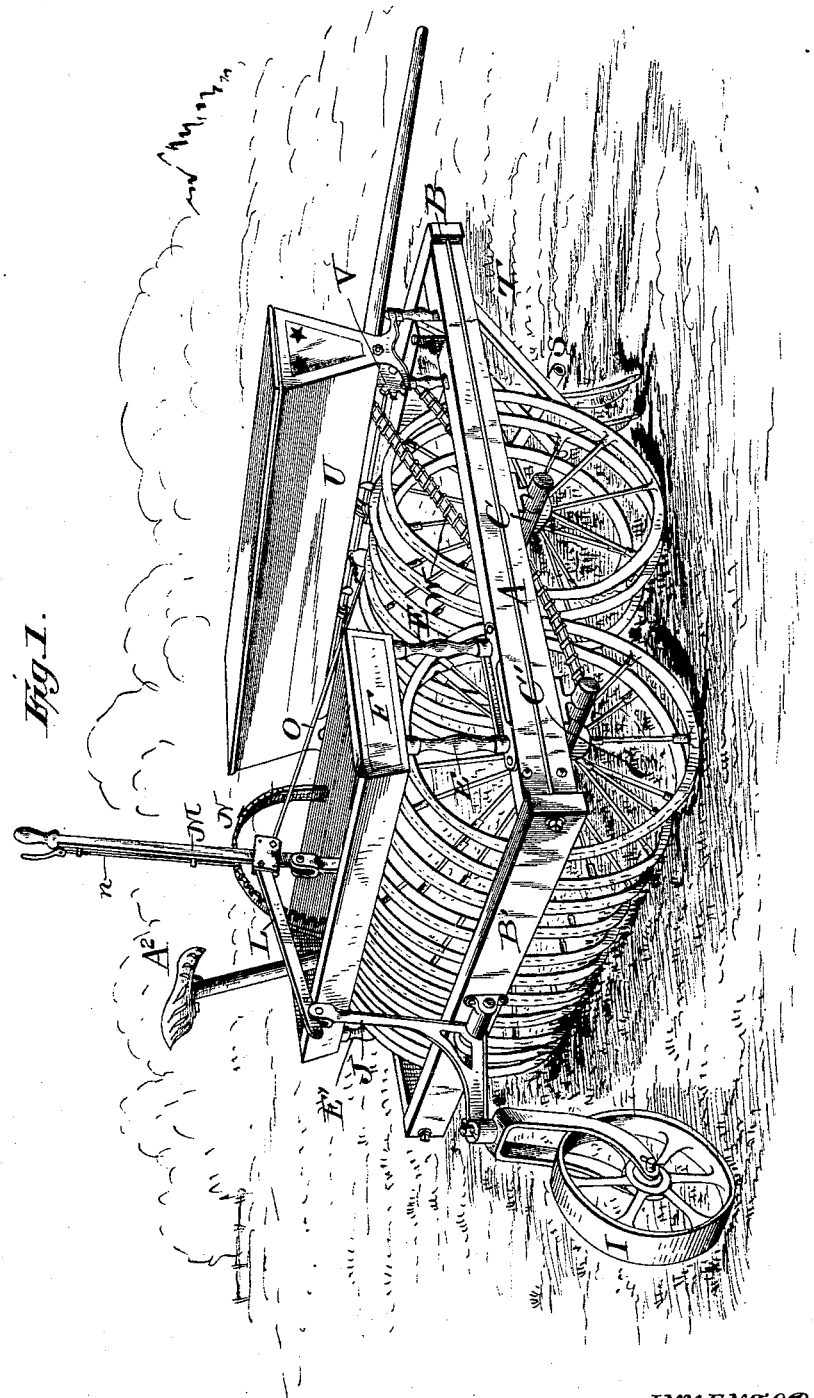
WITNESSES
F. L. Durand
E. K. Stewart
INVENTOR.
Hardy W. Campbell.
By M. F. Chamblin.
Attorney (No Model.) 3 Sheets—Sheet 2.
H. W. CAMPBELL.
SEEDER, ROLLER, AND PULVERIZER.
No. 479,242. Patented July 19, 1892.
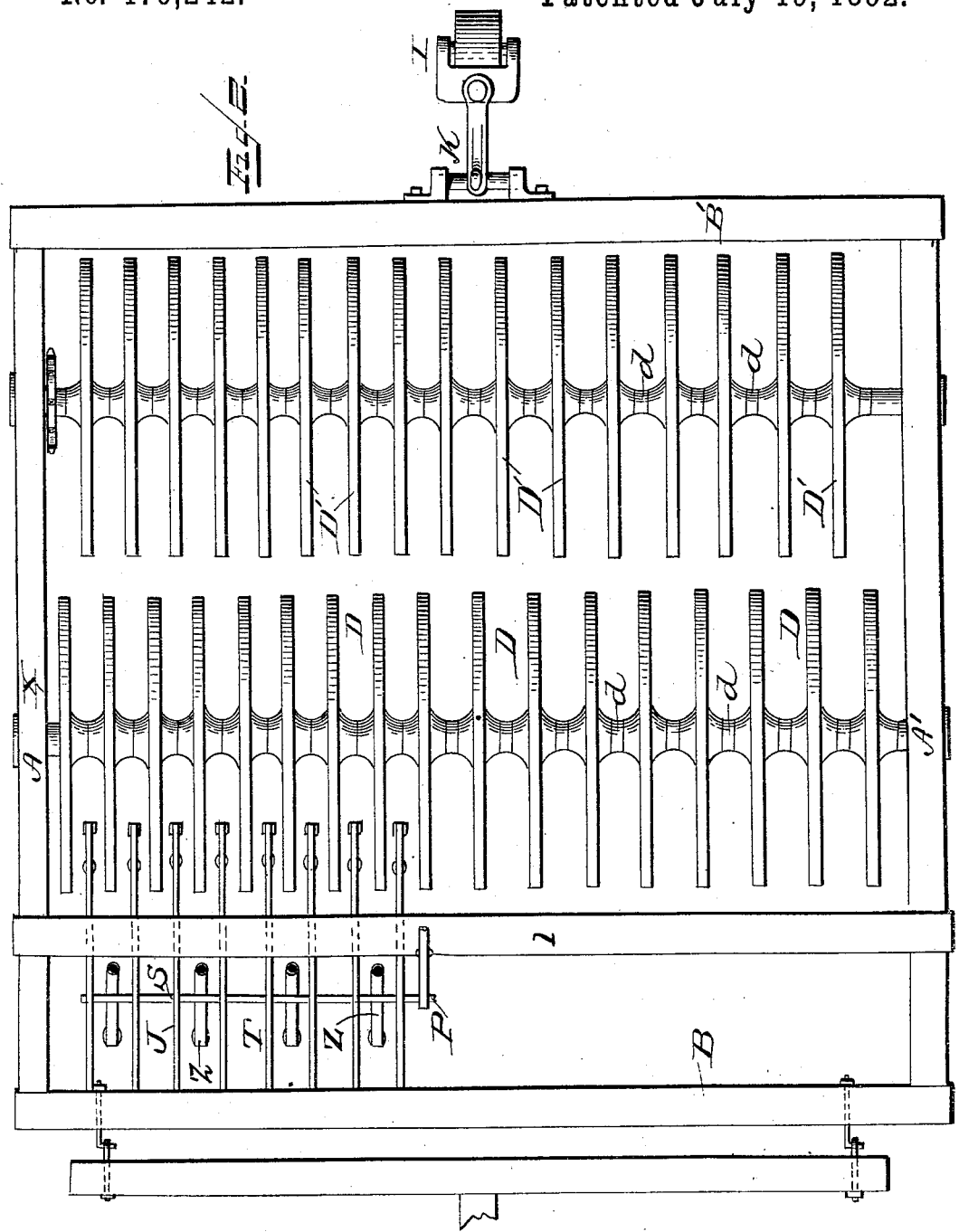
WITNESSES
F. L. Ourand
E. N. Stewart
INVENTOR
Hardy W. Campbell
By M. F. Chamblin.
Attorney (No Model.) 3 Sheets—Sheet 3.
H. W. CAMPBELL.
SEEDER, ROLLER, AND PULVERIZER.
No. 479,242. Patented July 19, 1892.
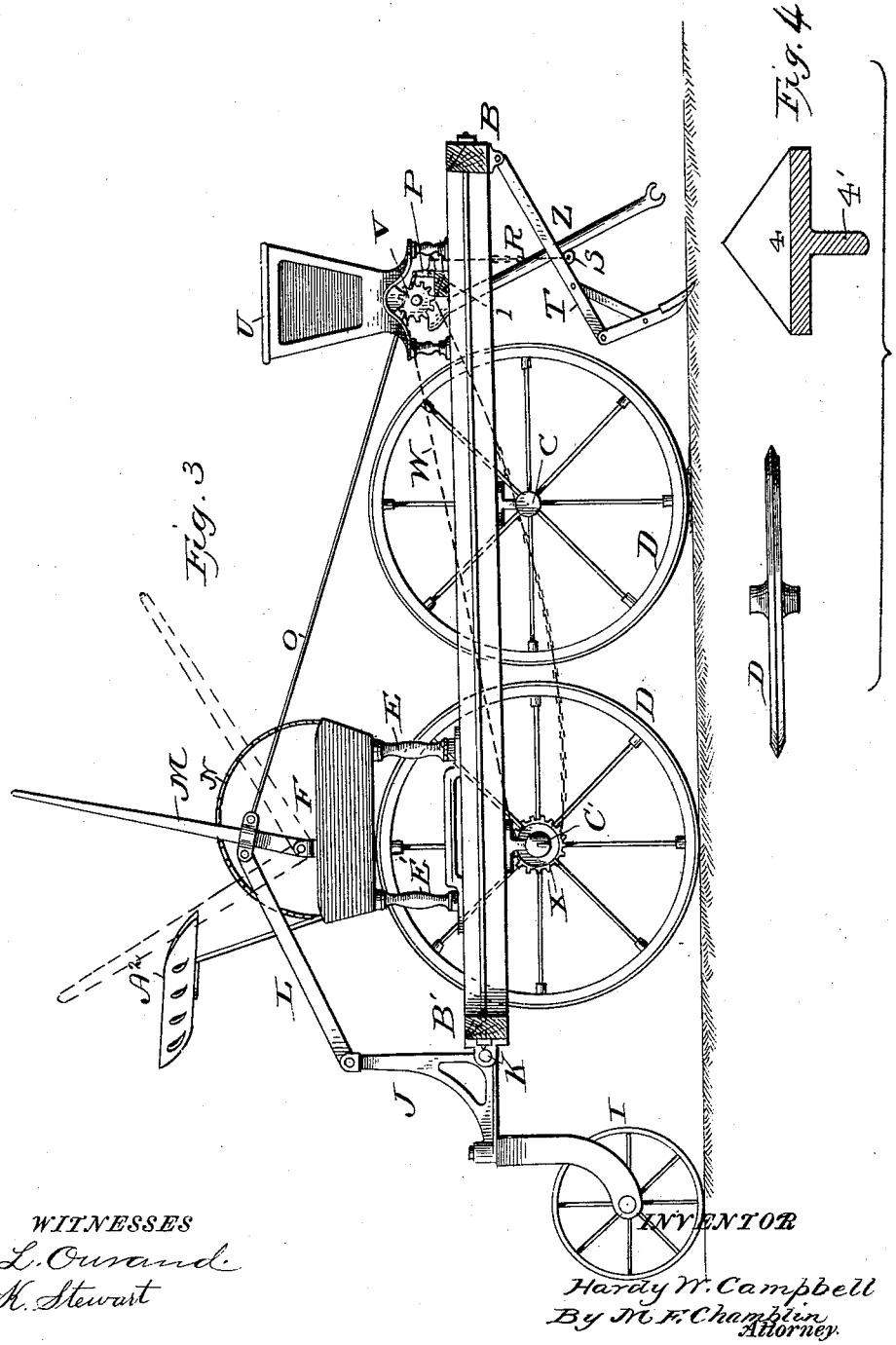
WITNESSES
F. L. Ourand
E. K. Stewart
INVENTOR
Hardy W. Campbell
By M. F. Champlin
Attorney.

United States Patent Office.

HARDY W. CAMPBELL, OF PUTNEY, SOUTH DAKOTA.

SEEDER, ROLLER, AND PULVERIZER.

SPECIFICATION forming part of Letters Patent No. 479,242, dated July 19, 1892.

Application filed March 24, 1892. Serial No. 426,246. (No model.)

*To all whom it may concern:*

Be it known that I, HARDY W. CAMPBELL, a citizen of the United States, residing at Putney, in the county of Brown and State of South Dakota, have invented certain new and useful Improvements in Combined Seeders, Rollers, and Pulverizers; and I do hereby declare the following to be a full, clear, and exact description of the invention, such as will enable others skilled in the art to which it appertains to make and use the same.

My invention relates to a combined seeder, soil-packer, and pulverizer; and the object of the same is to provide a machine which is especially adapted to perform the functions necessary in the preparation of the soil for a good crop on the Western prairies. In order to do this, the following conditions are necessary: first, thorough and complete pulverizing and packing of the soil to the extreme bottom of a deep furrow, with a view of shutting out or closing all the air-cells, so that the soil will retain the moisture; second, the extreme top of the soil should be left loose and covered with small lumps or clods to prevent the wind from blowing the same away from around the roots of the growing crops, as well as taking up the moisture in the soil by evaporation.

The construction, combination, and operation of my machine is fully described and illustrated in this specification and in the accompanying drawings, in which—

Figure 1 is a perspective view of my machine. Fig. 2 is a top plan view. Fig. 3 is a side view of the machine. Fig. 4 is a modified cross-sectional view of the tire of the wheel used upon my machine.

Referring to the drawings, the letters A and A' designate the longitudinal pieces of the frame of my invention, and the letters B and B' the cross-pieces of same. This frame is secured together in any suitable way. Near the center and rear portions of said frame there is rigidly secured to the longitudinal pieces A and A' the axles C and C'. Upon each of said axles there is mounted a series of wheels D and D'. It will be observed in Fig. 2 that the wheels upon the rear axle C' are so arranged as to track or run between the tracks of the wheels D upon the front axle or journal C.

E and E' represent two upright posts cast in one piece and bolted to the longitudinal piece A and A' and the sliding bed F, so that said bed can be adjusted backward or forward, with a view of shifting the weight at will upon either series of wheels D and D'. This is a valuable and important feature of my invention.

It will readily be seen that as the bed F rests upon the upright posts E and E' the same is rigidly secured in its normal position and any desired weight may be placed in said bed with a view of weighing down the machine aforesaid for the purpose of forcing the wheels D and D' deeply into the soil, and thereby thoroughly pulverizing and packing the same in the bottom of the furrow, as well as cutting up the larger clods. As the wheels D are some distance in front of the rear wheels D', they naturally cut a furrow in the plowed land, into which the clods fall from each side thereof, and thereby escape being crushed by the rear wheels, which track alongside or between the front series of wheels. These clods perform an important and twofold function — namely, they shade the top of the soil and prevent the wind from blowing the loose dirt away from around the roots of the growing crop. As it is necessary to have the wheels wider apart when it is used as a pulverizer and packer, there may be located between the series of wheels D and D' the rings $d$ when it is desired that said wheels shall so work upon their respective axles. When used in connection with seeder or drill for top packing, these wheels should be at least one fifth closer.

$A^2$ indicates the seat for the driver, which is secured upon suitable springs to the rear of the bed F.

Fig. 4 illustrates a tire which on top has the shape of an inverted V, which may be applied to the series of wheels D and D' in the event it is desired to pack and pulverize new and soddy ground where the flat-face tire will not penetrate, especially so if the sod or turf is at all tough.

I represents a caster-wheel, which is pivoted to the rear end of the bell-crank lever J. Said lever J is pivoted to a projecting iron K in the center of the rear cross-beam B' of the machine. In the top end of said bell-crank lever there is secured a rod L, which is connected to the handle M, which is pivoted to the inner side of the bed F. There is also secured to the bed F alongside the handle M a ratchet-segment N, which operates with the pawl n, which is pivoted to the handle M. It will readily be observed that by pulling the handle M backward, as indicated by dotted lines, Fig. 3, the bell-crank lever J forces downward the caster-wheel I, by means of which the weight of the machine is thrown upon said caster-wheel and the front series of wheels D. This raises the series of wheels D' slightly off of the ground for a twofold purpose, viz: to stop the feed and facilitate turning around. Consequently when the machine is in this position the driver can turn the machine around in any direction desired or drive to and from the field without scattering the grain. I attach great importance to this feature of my invention. There is also pivoted to the handle M another connecting rod or chain O, which extends forward and is secured to the top end of another bell-crank lever P, which is secured to the center of the cross-bar 1. To the lower end of the bell-crank lever P there is secured a chain R, which extends downward and is connected to a bar S, which runs under the series of drag-bars T, to which is secured the cultivators. Said drag-bars are pivoted to the cross-bar B. Such being the case, it is easily understood how said bars are raised and lowered by means of the handle M.

U designates the seed-box, which is secured to the front of the frame and is provided with the usual feed mechanism V. Said feed mechanism is run by means of the sprocket-chain W, which is connected with the sprocket-wheel X, that is secured to the rear axle C'. This feed mechanism is thrown out of gear or stopped by raising the rear axle and wheels from the ground, as heretofore described.

Z indicates a series of seed-tubes, which extend forward from the seed-box U and down nearly to the soil at an angle sufficient to properly sow the seed broadcast. These seed-tubes are secured to the cross-beam 1 of the machine and to the bottom of the seed-box.

Having thus fully described my invention, what I claim as new, and desire to secure by Letters Patent, is—

1. In a combined roller, soil packer and pulverizer, the combination of a suitably-constructed frame having the bed F, the axles C and C', secured near the center and rear portions of said frame, the series of wheels mounted upon said axles, the caster-wheel secured to the center of the rear cross-bar of the frame, and the mechanism whereby the weight of said machine is thrown upon said caster-wheel and the front series of wheels D, substantially as described, and for the purpose set forth.

2. In a combined seeder, roller, soil packer and pulverizer, &c., the combination of a suitably-constructed frame provided with the bed F, the axles C and C', secured near the center and rear portions of said frame, the series of wheels D and D', mounted upon said axles, the caster-wheel secured to the center of the rear cross-bar of the frame, the drag-bars pivoted to the cross-bar B, the seed-box located in front of the bed F and upon the ends of the longitudinal pieces A and A' and provided with a suitable feed mechanism, the seed-tubes secured to the cross-bar 1 of the machine and the bottom of the seed-box, and the mechanism whereby the caster-wheel I, the drag-bars, and the feeding mechanism are operated, substantially as described, and for the purpose set forth.

3. In a combined seeder, roller, soil packer and pulverizer, &c., the combination of a suitably-constructed frame with the axle-bars secured near the front and rear portions of said frame, the series of wheels mounted upon said axle-bars, the caster-wheel secured to the center of the rear cross-bar of the frame, the seed-box located upon the front ends of the longitudinal pieces A and A' and provided with a suitable feed mechanism, and the mechanism whereby the caster-wheel I and feeding mechanism are operated, substantially as described, and for the purpose set forth.

In testimony whereof I affix my signature in presence of two witnesses.

HARDY W. CAMPBELL.

Witnesses:
   J. H. DAVIS,
   B. L. PERRY.